2,999,017
**PROCESS FOR THE MANUFACTURE
OF CHOCOLATE**
Helmut Roederer, Hamburg-Volksdorf, and Hans-Heinrich Völker, Vahrendorf, near Hamburg, Germany, assignors to Corn Products Company, a corporation of Delaware
No Drawing. Filed Jan. 12, 1959, Ser. No. 786,054
Claims priority, application Germany Jan. 23, 1958
7 Claims. (Cl. 99—23)

This invention relates to a process for the production of chocolate products, which, preferably, and exclusively, contain dextrose hydrate ($C_6H_{12}O_6.H_2O$) instead of sucrose.

As is known, chocolate contains a mixture of at least 40 parts of cocoa mass or cocoa mass and cocoa butter and at most, 60 parts of sucrose. The normal production method is to subject the cocoa beans to fine grinding in several operations, so that a thin-flowing mass, the so-called cocoa mass, is produced which is then subjected to a grinding, grating and stirring treatment (conching) with the sweetener, principally sucrose, sometimes with the addition of further substances, such as powdered milk or cream. Hereby, the chocolate mass is heated to temperatures over 60° up to about 100° C., in order to remove the moisture present in the cocoa components and other ingredients. With this method of working it is possible to allow the mass to cool at any time without the quality of the chocolate products suffering thereby.

It is also already known that in manufacturing chocolate, the sucrose is partially replaced by anhydrous dextrose or dehydrated dextrose hydrate. Further it is known that chocolate can be manufactured with the addition of dextrose hydrate and the water of crystallization bound in the dextrose removed by heating the chocolate to 60° up to 70° C. This mass, however, cannot be worked after cooling. Until now it has not been technically possible to manufacture a chocolate which contains dextrose hydrate exclusively instead of sucrose, because the comparatively high temperatures used in the usual manufacturing processes cause a loss of the water of crystallization content of the dextrose and therefore a crusting of the chocolate mass results. These drawbacks are eliminated by the present invention.

The present invention is based on the new discovery that the difficulties hitherto connected with the use of dextrose as processing sweetener are due to the loss of its water of crystallization during the process. This invention therefore relates to a process for the manufacture of chocolate products which preferably contain dextrose hydrate as sole sweetener which does not have the drawbacks described. The new process consists principally of the manufacture of chocolate products in which dextrose is preferably used as sole sweetener under such conditions that the water of crystallization content of the dextrose for the most part remains.

In carrying out the present invention it is preferable to first process the cocoa mass by itself in the known manner at temperatures of 60 to 120° C., and then the cocoa mass is processed to a chocolate mass with dextrose hydrate at a temperature of about 35 to about 45° C., preferably 38 to 42° C., in suitable equipment, for instance a melangeur, if necessary at the same time adding lecithin and cocoa butter.

The chocolate mass thus mixed is taken through rollers as soon as possible for further processing, the temperature remaining the same, and is then again put into the melangeur, with a further addition of cocoa butter, liquefied at a temperature of 35 to 45° C. The treatment in the rollers and melangeur is also repeated several times under the conditions given. Finally, the chocolate mass after being liquefied in the melangeur is made into bars or other chocolate products, the temperature being maintained at 35 to 45° C.

In the preferred form of the process dextrose hydrate is used entirely or partially in dust or powdered form. Apart from dextrose hydate, there may be added to the chocolate mass other sweeteners, for instance, monosaccharides such as xylose and fructose, or oligosaccharides such as maltose and lactose, or sugar alcohols, such as sorbitol, or also sucrose; in addition the addition of powdered milk or cream, dried fruits, roasted coffee, cola products, natural spices and vitamins is possible.

The important point about the new process is working at such low temperatures that the water of crystallization in the dextrose cannot escape. The temperatures, however, may not be much below those mentioned, because otherwise difficulties arise in processing.

By means of our invention it is now possible for the first time to make a chocolate which contains only dextrose hydrate without any sucrose. The chocolate products made in this way are equal to the usual chocolates containing sucrose on the basis of color, breaking qualities and firmness. In addition, it has been found that in the chocolates made with dextrose hydrate alone, even at increased storage temperature, there is no inclination to formation of fatty frost. A further advantage is to be seen in the fact that the chocolate made from dextrose hydrate, from the point of view of taste, allows the cocoa aroma to come through very strongly, and it is less sweet than the usual chocolates containing sucrose. Furthermore, a chocolate made exclusively with dextrose hydrate has a pleasant, cooling, refreshing taste.

The following examples which are intended as typical and informative only and not in a limiting sense, will further illustrate this invention.

*Example 1*

25 parts of cocoa mass, processed in the usual manner, are mixed at a temperature of 38 to 42° C. in a melangeur with 0.3 part of lecithin and 61 parts of dextrose hydrate having a water of crystallization content of 8.7 to 8.9 percent, with an addition of cocoa butter. The range of temperatures given may not be much higher or lower, so that on the one hand, a certain consistency of the mass is guaranteed, and on the other, as little water of crystallization as possible is lost from the dextrose, in order to prevent crusting.

While maintaining a temperature of 38 to 42° C., the mixed chocolate mass is refined again, so far as possible without interruption, by grinding in a five-roller mill. The liquidization of the ground chocolate mass is not done as usual, by conching, but by the addition of cocoa butter in the melangeur or circular mortar a temperature of 35 to 45° C. being maintained. In accordance with the quality of chocolate desired and the formula, the grinding is repeated under the conditions given.

The chocolate mass, ground once or several times, can be kept for some time at a temperature of 30 to 35° C. To avoid the loss of water of crystallization and to avoid crusting, however, it is to be recommended that the mass should be made into bars as soon as possible or into other chocolate products. Unlike the known processes, the chocolate mass need not be tempered before being made into bars, but rather, if necessary with the addition of cocoa butter, be liquefied in the melangeur or circular mortar at 38 to 42° C. and immediately made into bars or other chocolate articles.

The total amount of cocoa butter used should not exceed 15 parts. Chocolate made in this manner has an average moisture of 5.3 to 5.7 percent, consisting mostly of the water of crystallization in the dextrose hydrate.

Example 2

10 parts of cocoa mass are processed in the usual way and, at the temperature given in Example 1, are mixed in the melangeur with 0.3 part lecithin, 30 parts of powdered whole milk and 41 parts dextrose hydrate and cocoa butter.

The grinding of the chocolate mass is the same as in Example 1. Care must be taken that the periods between the various operations are kept as short as possible. The temperature given must also be maintained as exactly as possible, in order to prevent crusting of the mass.

The rolled chocolate mass is liquefied as quickly as possible in the manner described in Example 1, at a temperature of 38 to 42° C. and made into bars at the same temperature or into other chocolate products.

The total amount of cocoa butter used should not exceed 20 parts. A milk chocolate made in this manner contains an average moisture of 4.8 to 5.2 percent, which consists mostly of the water of crystallization of the dextrose hydrate.

In the same way, all other types of chocolate can be made, using the methods described above, such, for instance, as contain stimulant additives, roasted coffee, cola products or vitamins.

We claim:

1. A process for the manufacture of chocolate containing dextrose hydrate as the sole sweetener which comprises subjecting cocoa beans to a grinding and heating operation to produce a cocoa mass, and then mixing dextrose hydrate with said cocoa mass while maintaining the temperature at from about 35° to about 45° C.

2. Process according to claim 1, wherein said chocolate mass is thereafter ground, the temperature during grinding being maintained at about 35 to about 45° C.

3. Process according to claim 2, wherein the ground chocolate mass is liquefied and then formed into chocolate bars, the temperature still being maintained at about 35 to about 45° C.

4. Process according to claim 2, wherein said ground chocolate mass is liquefied by the addition of cocoa butter.

5. Process according to claim 1 wherein said cocoa beans are processed at a temperature within the range of about 60 to about 120° C.

6. Process according to claim 1 wherein cocoa butter is added with the dextrose hydrate.

7. Process according to claim 1 wherein the dextrose hydrate is at least partially in powdered form.

References Cited in the file of this patent

UNITED STATES PATENTS

| | | |
|---|---|---|
| 1,551,175 | Schneller | Aug. 25, 1925 |
| 2,133,586 | Stanger et al. | Oct. 18, 1938 |
| 2,146,178 | Farley | Feb. 7, 1939 |
| 2,171,244 | Otterbacher | Aug. 29, 1939 |